United States Patent [19]

Harada et al.

[11] 4,317,155

[45] Feb. 23, 1982

[54] SURGE ABSORBER

[76] Inventors: Mikio Harada, 1014; Kan-ichi Tachibana, 1019; Akio Uchida, 1019; Takashi Saitoh, 1019, all of Oaza Yokoze, Yokozemura, Chichibu-gun, Saitama, Japan

[21] Appl. No.: 68,181

[22] Filed: Aug. 20, 1979

[30] Foreign Application Priority Data

Mar. 27, 1979 [JP] Japan .................................. 54-35773

[51] Int. Cl.³ .............................................. H02H 9/04

[52] U.S. Cl. .................................... 361/120; 361/129; 313/218; 313/306

[58] Field of Search ............... 361/120, 118, 119, 129, 361/117; 315/37, 36; 313/256, 325, 306, 231.1, 213, 214, 217, 218, 245, 246, 251; 29/610, 613, 620

[56] References Cited

U.S. PATENT DOCUMENTS

| | | | |
|---|---|---|---|
| 2,620,453 | 12/1952 | Beese et al. | 361/120 X |
| 3,391,371 | 7/1968 | Wright et al. | 361/119 X |
| 3,654,511 | 4/1972 | Iwaya | 361/118 X |
| 3,898,533 | 8/1975 | Scudner, Jr. | 361/120 |
| 3,961,225 | 6/1976 | Tachibana et al. | 361/118 |
| 4,191,910 | 3/1980 | Larson | 313/218 X |

*Primary Examiner*—Patrick R. Salce
*Attorney, Agent, or Firm*—Edward J. Brenner

[57] ABSTRACT

A novel gap type surge absorber. The surge absorber comprises a plurality of conductive ceramic thin films formed on the surface of a molded insulating body and separated from each other by an extremely narrow gap, electrodes composed of a metallic material fixed to both ends of the plural conductive ceramic thin films and an inert gas sealed between the electrodes. The surge absorber is based on a two-stage discharge mechanism consisting of a discharge due to electrons emitted between the conductive ceramic thin films when a surge voltage is applied to the electrodes and a following creeping discharge generated between the electrodes. The surge absorber has a prolonged life and a good annealing characteristic as well as a very small discharge lag and a small electrostatic capacity and is excellent in cutting off a follow current.

7 Claims, 12 Drawing Figures

SURGE ABSORBER

BACKGROUND OF THE INVENTION

The present invention relates to an economical surge absorber which has a prolonged life and a good annealing characteristic as well as a very small discharge lag and a small electrostatic capacity and is excellent in cutting off a follow current.

Conventional surge absorbers comprise a gap type lightning arrester, ZnO varistor and the like. The gap type lightning arrester in which the electrodes are opposed to each other through the gap has a large discharge lag and is lacking in cutting off a follow current and further has a sparkover voltage different in the light and the dark. ZnO varistor is composed of ceramics consisting of ZnO and a small quantity of impurity such as $Bi_2O_3$, in which nonconductive $Bi_2O_3$ concentrates in the boundary of crystal grains of conductive ZnO, thereby generating varistor characteristics. However, ZnO varistor has a large electrostatic capacity and requires a fuse for safety, because it becomes short-circuited when electrically destroyed and is limited in use by its high residual voltage.

Accordingly, the applicant has proposed a two stage discharge type surge absorber, as an improved one of these conventional surge absorbers above mentioned, in Japanese Patent Applications No. 22185/1975 and No. 82598/1975. This two stage discharge type surge absorber comprises a plurality of areas of conductive thin film composed of carbon thin film, conductive paint thin film or metal thin film formed on the surface of a molded insulating body composed of mullite porcelain and the like having a small dielectric constant separated from each other by an air gap formed by marking off the conductive thin film with a streak having a very narrow width and making the surface of the molded insulating body exposed, electrodes fixed to the thus separated conductive thin film and, if required, a gas sealed between the electrodes.

In the above mentioned construction, when a surge voltage is applied to the electrodes, at first the electric field is concentrated to the air gap between the separated conductive thin films, as the separated conductive thin film is opposed to the adjacent one through the air gap respectively. The thickness of the conductive thin film is usually 0.1–100 μm, so the concentration grade of the electric field is large, and as the air gap in this case is supported by the surface of the molded insulating body having a relative inductive capacity of 6–10, the inductive capacity of the air gap is 6–10 times larger than that of a penetrating air gap, so the electric field is more and more concentrated to the air gap to emit easily electrons due to the electric field through the air gap, thus there is generated a first stage discharge.

Next, the electrons emitted by the first stage discharge collide with neighboring gas molecules and ionize them. New electrons flying out from the gas molecules in their ionization ionize further gas molecules. This phenomenon is repeated to accelerate the ionization of gas molecules, finally the insulation of gas is destroyed, thereby generating a gas discharge between the electrodes as a second stage discharge. Therefore, this second state discharge is extremely rapid, and is small in discharge lag. This gas discharge transfers from a glow discharge to an arc discharge as the surge current increases, but the main constituent of this gas discharge is a creeping discharge which is generated along the surface of the conductive thin film. As this creeping discharge is remarkably generated especially at an initial stage of the second stage gas discharge, it is effective in accelerating the second stage gas discharge and is very small in discharge lag. The relation between the first stage discharge and the second stage discharge can be understood by equivalent circuits shown in FIG. 9(*a*) and (*b*). Namely, the first stage discharge is only an electron emission through the streak 3 and in the second stage discharge, the main constituent of the discharge is a gas discharge which is mainly composed of a creeping discharge generated between the electrodes 4, 4 parallel with the streak 3.

Thus, the surge absorber based on a two stage discharge mechanism, that is, the two stage discharge type surge absorber has the following features, as compared with the conventional gap type lightning arrester and ZnO varistor:

(1) discharge lag is small.

(2) cutting off of a follow current is good.

(3) sparkover voltage is stable.

(4) electrostatic capacity is small.

(5) short-circuit is not generated when electrically destroyed.

(6) residual voltage is small.

However, the two stage discharge type surge absorber above-mentioned was still insufficient in surge absorbing characteristics, especially unsatisfactory in life- and annealing characteristics.

BRIEF SUMMARY OF THE INVENTION

It is an object of the present invention to provide a surge absorber which holds the features of the above-mentioned two stage discharge type surge absorber intact and is improved in surge absorbing characteristics, especially in life- and annealing characteristics.

According to the present invention, there is provided a surge absorber comprising a plurality of areas of conductive ceramic thin film formed on the surface of a molded insulating body having a relative inductive capacity of more than 1 and separated from each other by a streak of less than 200 μm in width, electrodes consisting of an anticorrosive and highly conductive metallic material directly fixed to both ends of said plurality of areas of conductive ceramic thin film and apart from said streak respectively, and at least one gas selected from the group consisting of rare gases and nitrogen gas sealed between the electrodes by means of an insulating covering material, so as to generate an electron emission through said streak as a first stage and then generate a creeping discharge between said electrodes as a second stage when a surge voltage is applied to said electrodes.

The above and further object and features of the invention will more fully appear from the following detailed description when the same is read in connection with the attached drawings.

BRIEF DESCRIPTION OF THE ATTACHED DRAWINGS

FIG. 1(*b*) is a longitudinal sectional view of the embodiment of FIG. 1(*a*).

FIG 1(*c*) is a cross sectional view taken on line I—I of FIG. 1(*b*).

Figure 8:
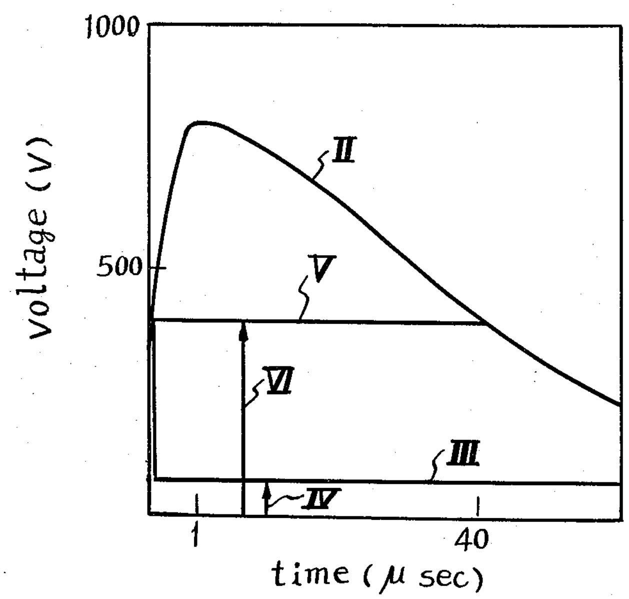

FIG. 8 is an impulse surge absorbing dcharacteristics view representing the relation between time and voltage of the surge absorber of the invention and ZnO varistor when an impulse surge is applied thereto respectively, where II is an original wave form of the impulse surge, III is a surge absorbing wave form of the surge absorber of the invention, IV is a residual voltage of the surge absorber of the invention, V is a surge absorbing wave form of ZnO varistor and VI is a residual voltage of ZnO varistor.

Figure 9:
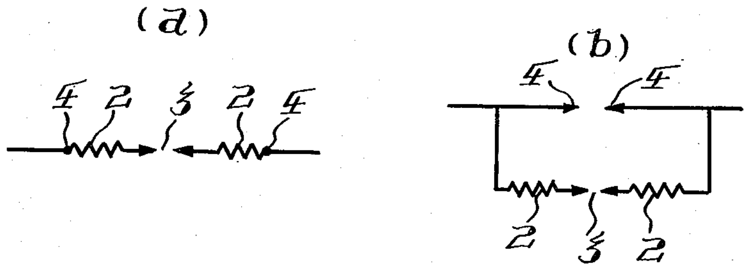

FIG. 9(*a*) is an equivalent circuit representing the first stage discharge mechanism of the invention.

FIG. 9(*b*) is an equivalent circuit representing the second stage discharge mechanism of the invention.

DETAILED DESCRIPTION OF THE INVENTION

Figure 1:
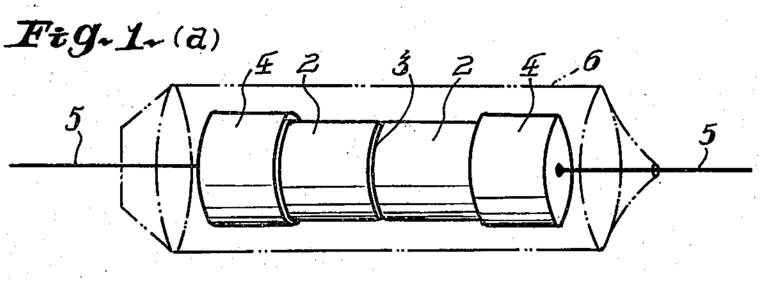
FIG. 1(*a*) is a perspective view of a fundamental embodiment of the invention.
Figure 1:
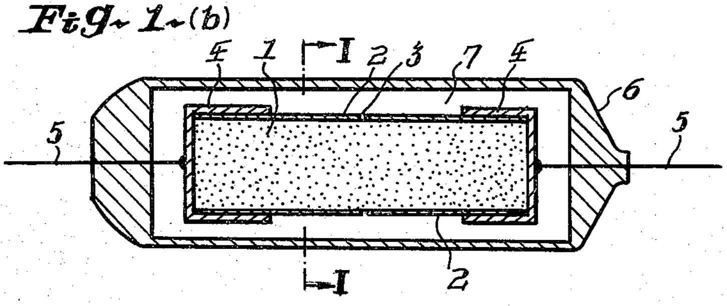
Figure 1:
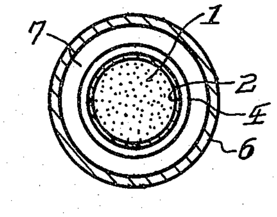

As shown in FIG. 1(*a*), (*b*), (*c*), the surge absorber of the invention comprises fundamentally two areas of conductive ceramic thin film 2 formed on the surface of a molded insulating body 1 having a relative inductive capacity of larger than one and separated from each other by a streak 3 having a width of less than 200 μm, electrodes, 4, 4 directly fixed to each of two separated conductive ceramic thin films 2, 2 and apart from the streak 3 respectively, lead wires 5, 5 fastened to electrodes 4, 4 respectively and at least one gas 7 selected from the group consisting of rare gases and nitrogen gas sealed between the electrodes 4, 4 by use of an insulating covering material 6.

Next, there are described elements of the surge absorber of the invention.

The molded insulating body used in the surge absorber of the invention is required to have a relatively inductive capacity of larger than one to make the electric field concentrate toward the streak and to facilitate generation of the first stage discharge through the streak. However, when the relative inductive capacity thereof becomes too large, the electrostatic capacity thereof also becomes large, giving a bad influence in incorporating the surge absorber into a circuit. Therefore, the relative inductive capacity of the molded insulating body of the invention is preferably in the range of 6–10. For example, mullite porcelain, forsterite porcelain, alumina porcelain and steatite porcelain are preferable as the insulating body of the invention as shown in the following table. These insulating bodies are not limited in shape.

| insulating body | relative inductive capacity |
|---|---|
| mullite porcelain | 6–8 |
| forsterite porcelain | 6–7 |
| alumina porcelain | 8–10 |
| steatite porcelain | 6–7 |

The conductive thin film deposited on the surface of the above mentioned molded insulating body constitutes the nucleus of the invention. Namely, the conductive thin film of the invention is composed of one of ceramics consisting of conductive metal oxides and interstitial nitrides. These conductive metal oxides are metal oxides made conductive with addition of a very small quantity of impurity like usual semiconductor, for metal oxides are generally nonconductive. $SnO_2$, $Nb_2O_5$, $MoO_3$ and $WO_3$ are preferable as the conductive metal oxides of the invention. On the other hand, nitrides of transition element correspond to the interstitial nitrides, in which nitrogen atoms enter between metal atoms and which are conductive even without addition of a very small quantity of impurity. TiN and TaN are preferable as the interstitial nitrides of the invention. These conductive metal oxides and interstitial nitrides have all a high melting point and are excellent in oxidation resistance and corrosion resistance.

In order to make the above mentioned conductive ceramic thin film deposited on the surface of the molded insulating body, the following processes are carried out. For example, in the case of tin oxide ($SnO_2$), tin chloride ($SnCl_4$) is blown on the surface of the molded insulating body kept at high temperature to be deposited thereon as a tin oxide ($SnO_2$) thin film. In the cases of titanium nitride (TiN) and tantalum nitride (TaN), titanium and tantalum in form of vapor or ion are generated in the reduced atmosphere of nitrogen gas to be deposited on the surface of the molded insulating body as a respective nitride thin film. These deposited nitride thin films have a good sticking property, and especially when a high frequency ion plating process is used, the sticking velocity is accelerated and the sticking property is further improved, so the ion plating process is preferable in sticking a conductive ceramic thin film which is thick.

As for the thickness of the conductive ceramic thin film thus deposited it is preferable from the standpoint of life characteristics that it is to some extent thick. As mentioned above, the conductive ceramic thin film of the invention has a good sticking property to the surface of the molded insulating body, so it can be fairly thickened in thickness and does not peel off in discharge even when so thickened. On the contrary, the conductive thin film of the conventional two stage discharge type surge absorber has the possibility of peeling off in discharge when thickened in thickness.

Figure 4:
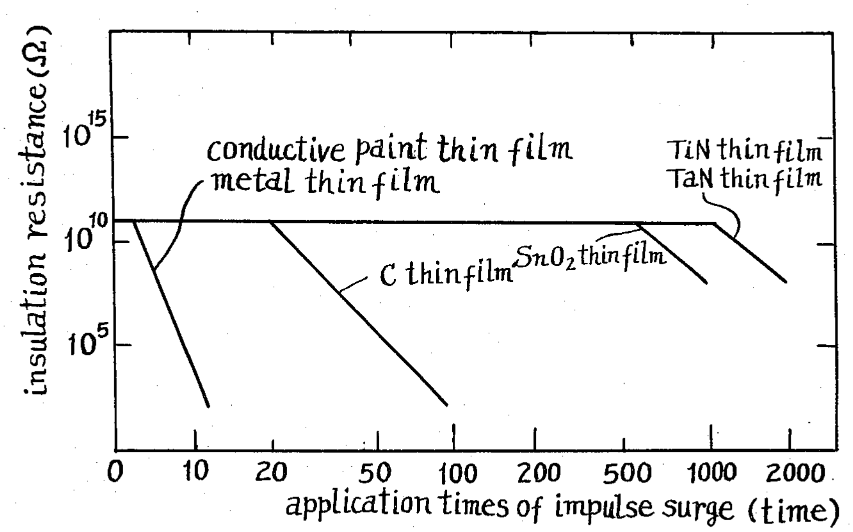
FIG. 4 is a life characteristics view representing the relation between application times of an impulse surge having a wave form of (8×20) μsec and a current of 500A and an insulation resistance of a surge absorber when the impulse surge is applied to the surge absorber at intervals of 30 seconds.

Thus, as the conductive ceramic thin film of the invention is composed of one selected from the group consisting of the conductive metal oxides and the interstitial nitrides which have a high melting point and are excellent in oxidation resistance and corrosion resistance and can be fairly thickened in thickness owing to its good sticking property to the surface of the molded insulating body, so there is generated neither fusion of the opposed conductive ceramic thin films containing the air gap followed by the disappearance of the air gap nor scattering of the conductive ceramic thin films when an impulse surge is applied to the electrodes. Therefore, the surge absorber of the invention is remarkably improved in life characteristics as shown in life characteristics view of FIG. 4. For example, $SnO_2$ thin film does not show the decrease of the insulation resistance due to deterioration until 500 times of impulse surge application and TiN and TaN thin films do not show the decrease of the insulation resistance due to deterioration until 1000 times respectively. Even when deteriorated, the insulation resistance thereof does not decrease below $10^5\ \Omega$, so there is generated no shortcircuit. On the contrary, the conductive thin films of the conventional two stage type surge absorber are all bad in life characteristics against impulse surge and lacking in durability as shown in FIG. 4. Namely, as the conventional conductive paint thin film and metal thin film have both a low melting point, they are apt to be fused by discharge, causing the disapperance of the air gap of the streak, and deteriorated by only several times of impulse surge application, making the insulating resistance decrease. And the conventional carbon thin film is apt to be consumed by discharge and deteriorated by about 20 times of impulse surge application.

Next, there is described the width of the streak with which the above mentioned conductive ceramic thin film is marked off.

It is generally preferable to make a discharge lag small so that the width of the streak is narrow. However, when it is too narrow, it is feared that there can be generated a short-circuit due to the disappearance of the air gap caused by fusion of the opposed conductive thin films in discharge, while when too wide, the discharge through the streak is increased and the conductive thin film is worn out thereby to be short-lived.

Figure 5:
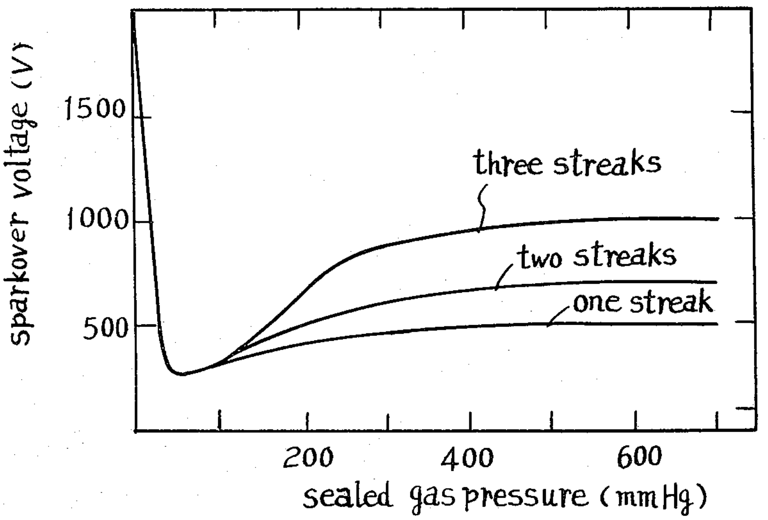
FIG. 5 is a graph representing the relation between a sealed gas pressure between the electrodes of the surge absorber of the invention and a sparkover voltage thereof when the number of the streak marking the conductive ceramic thin film thereof is varied.

In the present invention, as the conductive ceramic thin film having a high melting point is used as a conductive thin film, so there occurs no short-circuit due to the fusion of the opposed conductive ceramic thin film in discharge. Therefore, the width of the streak can be sufficiently narrow, thereby making the discharge lag smaller and decreasing the discharge through the streak. Namely, in the surge absorber of the invention, the width of the streak is under 200 μm, especially preferably under 50 μm. When the width of the streak is over 200 μm, it is feared that when an impulse surge is applied, the concentration grade of the electric field through the streak is decreased, to make the discharge lag larger. The number of the streaks is not fixed and is variable according to use and object, and in the case where the number of the streaks is increased, the sparkover voltage can be increased as shown in the relation between a sealed gas pressure and a sparkover voltage of FIG. 5. Therefore, the discharge lag can be made to be small by making the width of the streak narrow and the sparkover voltage can be regulated by the number of the streaks.

In order to mark uniformly the above mentioned conductive ceramic thin film with a streak having a narrow width, generally laser beam is used. As laser, solid laser such as YAG laser and gas laser such as argon gas laser are used, especially YAG laser is preferable owing to its stability. When the laser beam is used, the width of the streak is optimally under 200 μm owing to the focal length of laser beam and the thickness of the conductive ceramic thin film. Besides, when the width of the streak is over 50 μm, a diamond cutting edge is also used.

Next, a remarkably anticorrosive and highly conductive metal- or alloy piece as an electrode is directly fixed to each of the two end conductive ceramic thin films thus separated by mechanical pressing. As the metal in this case, nickel is used and as the alloy, stainless steel and Kovar are used. As Kovar is especially excellent in conductivity and corrosion resistance, life is about 10% longer in case of Kovar than in case of stainless steel. These electrodes are not limited in shape. Then, a lead wire is respectively fastened to each of the electrodes by means of welding. As a lead wire, Dumet wire is used, for in the present invention glass is used as an insulating covering material for sealing gas between the electrodes and Dumet wire is preferable as a glass penetrating wire. Lead glass is preferable as the insulating covering material.

As a sealing gas between the above mentioned electrodes, at least one gas selected from the group consisting of rare gases and nitrogen gas is used. Especially, a mixed gas consisting of argon gas 0.1%–10.0% and neon gas 99.9%–90.0% (Penning gas) is preferable as a sealing gas, for it reduces the sparkover voltage to the lowest. Although the pressure of the sealed gas is not limited, the reduced pressure is preferable. Namely, when the sealed gas is in the reduced state, working becomes easy owing to shrinkage of heat-softened glass, in sealing gas by use of glass, and further as shown in the relation between a sealed gas pressure and a sparkover voltage of FIG. 5, the sparkover voltage is stable in the range of 50–700 mmHg of the sealed gas pressure, so there is seen no deviation in quality of the product. Thus, the sealed gas in the reduced state is preferable for mass production.

The surge absorber of the invention, thus constructed by combination of the above mentioned elements, generates two stage discharges when a surge voltage is applied to the electrodes, like the conventional two stage discharge type surge absorber and in addition has the following features.

(1) As the surge absorber of the invention uses conductive ceramic thin film which has a high melting point and is excellent in oxidation resistance and corrosion resistance as conductive thin film, it is remarkably improved in life characteristics, as compared with the conventional two stage discharge type surge absorber as shown in the life characteristics view of FIG. 4.

Figure 6:
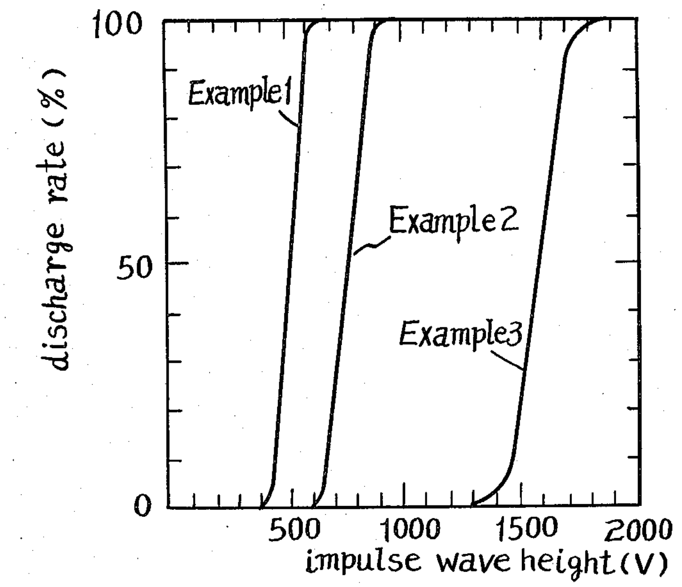
FIG. 6 is a discharge rate characteristics view representing the relation between an impulse wave height of an impulse surge having a wave form of (1×40) μsec and a discharge rate of the surge absorber of the invention when the number of the streak thereof is varied and the impulse surge having the wave form above mentioned is applied thereto.

(2) The surge absorber of the invention, as shown in the discharge rate characteristics view of FIG. 6, shows the almost vertically standing curves representing the relation between an impulse wave height and a discharge rate in the case where an impulse surge having a wave form of $(1 \times 40)$ μsec is applied, indicating that the sparkover voltage is stable. This is attributed to the characteristics of the conductive ceramic thin film.

(3) The surge absorber of the invention is high in arc holding voltage and is excellent in cutting off a follow current, for the conductive ceramic thin film has a greater resistance than the conventional conductive thin film.

Figure 7:
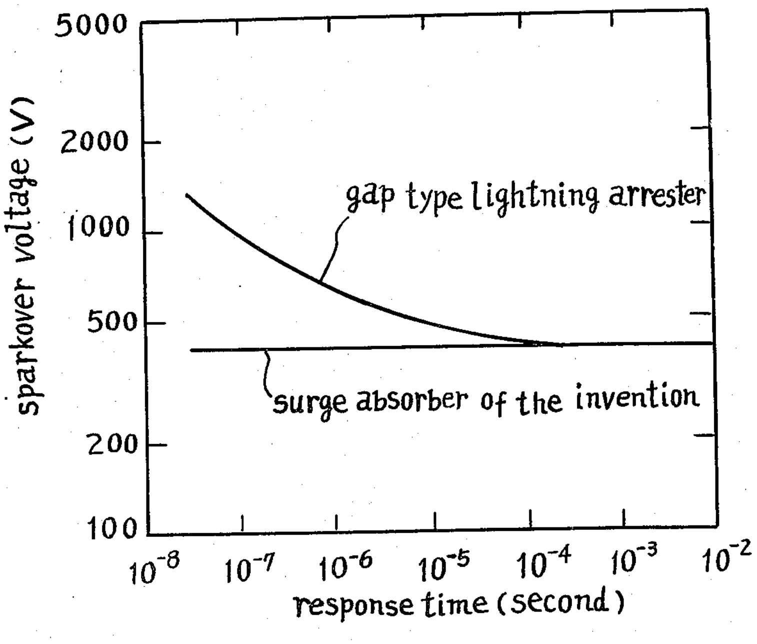
FIG. 7 is a V-t characteristics view representing the relation between a response time and a sparkover voltage of the surge absorber of the invention and the gap type lightning arrester when an impulse surge is applied thereto respectively.

(4) The surge absorber of the invention can make a discharge lag smaller than the conventional two stage discharge type surge absorber, for the conductive ceramic thin film has a high melting point and has no possibility of being fused even when the width of the streak is made narrow. FIG. 7 shows V-t characteristics in the case where impulse surges having various wave forms are applied to the surge absorber of the invention of which the conductive ceramic thin film is marked off with one streak having a width of 50 μm and to the gap type lightning arrester respectively. FIG. 7 shows clearly that the surge absorber of the invention has a remarkably small discharge lag.

(5) The surge absorber of the invention is improved in safety, for the insulation resistance at breakdown of the conductive ceramic thin film having a high melting point and a high sticking strength for the surface of the molded insulating body increases from $10^2\ \Omega$ of the conventional conductive thin film to $10^8\ \Omega$ as shown in FIG. 4.

(6) The surge absorber of the invention can be also applied to communication appliances without hindrance, for the electrostatic capacity between the electrodes is under 1 pF, smaller than that of ZnO varistor, and has no bad influence on other circuits.

(7) The surge absorber of the invention is improved in yield of industrial manufacturing from 50% to 80% by stabilization of electrical characteristics and annealing characteristics, while the conventional two stage discharge type surge absorber can not be sufficiently annealed owing to its short life.

(8) The surge absorber of the invention can be applicable to enlarged uses, especially also to light electrical appliances such as communication appliance, for the impulse surge absorbing characteristics are excellent and the restriction voltage is low as shown in the impulse surge absorbing characteristics of FIG. 8.

(9) The surge absorber of the invention can flow a large current in annealing to make an annealing time reduced and make industrial manufacturing profitable, for the ceramic thin film has a high melting point.

The present invention provides, as described above, an economical surge absorber which holds the features of the conventional two stage discharge type surge absorber intact and is improved in surge absorbing characteristics, especially in life and annealing characteristics, therefore it is industrially of great value.

The present invention will be understood more readily with reference to the following examples. The examples, however, are intended to illustrate the present invention and are not to be construed to limit the scope of the present invention.

EXAMPLE 1

FIG. 1(*a*) and FIG. 1(*b*) are respectively a perspective view and a longitudinal sectional view of this example. FIG. 1(*c*) is a cross sectional view taken on line I—I of FIG. 1(*b*).

In this example, a molded insulating body 1 is manufactured by extruding mullite porcelain powder into a cylinder and then burning the thus extruded cylinder at a temperature of more than 1,300° C. in the air. Next, tin tetrachloride ($SnCl_4$) is blown on the surface of the molded insulating body 1 which is kept at 800° C. in the air to be deposited thereon as a tin oxide ($SnO_2$) thin film 2. Then, the tin oxide thin film 2 thus deposited on the surface of the molded insulating body 1 is marked off with a streak 3 having a width of about 50 μm by use of YAG laser to be separated into two areas. Cap-like electrodes made of stainless steel 4, 4 are directly fixed to both ends of the separated tin oxide thin films 2, 2 respectively by mechanical pressing. Dumet wires 5, 5 are fastened to the electrodes 4, 4 respectively by welding. Next, the thus constructed element is introduced into the reduced atmosphere of a mixed gas 7 consisting of 0.5% of argon gas and 99.5% of neon gas having a pressure of 200 mmHg to be covered wholly with lead glass 6 for sealing the mixed gas 7 between the electrodes 4, 4.

In this construction, the electrostatic capacity of this example is 0.5 pF and the DC sparkover voltage is 250 V. The discharge rate curve of this example is shown by a curve of FIG. 6 which is indicated as Example 1. According to FIG. 6, when a surge voltage having an impulse surge wave form of (1×40) μsec is 520 V, the discharge rate is 50% and when the surge voltage is 640 V, the discharge rate is 100%. Further, when an impulse surge voltage is applied under application of 100 V of DC voltage, a follow current is cut off by limiting DC current to 10 A.

EXAMPLE 2

Figure 2:
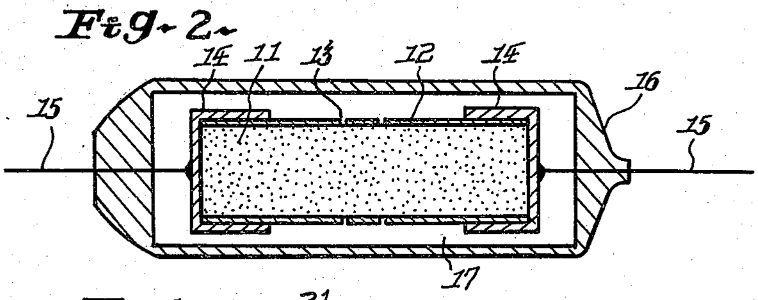
FIG. 2 is a longitudinal sectional view of another embodiment of the invention.

FIG. 2 is a longitudinal sectional view of this example.

In this example, a molded insulating body 11 is manufactured by extruding alumina porcelain powder into a cylinder and then burning the extruded cylinder at a temperature of more than 1,300° C. in the air. Titanium vapor or ion is generated in the reduced atmosphere of nitrogen gas to be deposited on the surface of the molded insulating body 11 as a titanium nitride (TiN) thin film 12. Then, the titanium nitride thin film 12 thus deposited on the surface of the molded insulating body 11 is marked off with two streaks 13, 13 having a width of about 10 μm by use of argon gas laser to be separated into three areas. Cap like electrode made of nickel 14 is directly fixed to each of the end titanium nitride thin films 12, 12 respectively by mechanical pressing. Dumet wires 15 is fastened to each of the electrodes 14, 14 respectively by welding. Next, the thus constructed element is introduced into the reduced atmosphere of argon gas 17 having a pressure of 100 mmHg to be covered wholly with lead glass 16 for sealing the argon gas 17 between the electrodes 14, 14.

In this construction, the electrostatic capacity of this example is 0.5 pF and the DC sparkover voltage is 450 V. The discharge rate curve of this example is shown by a curve of FIG. 6 which is indicated as Example 2. According to FIG. 6, when a surge voltage having an impulse surge wave form of (1×40) μsec is 770 V, the discharge rate is 50% and when the surge voltage is more than 930 V, the discharge rate is 100%. Further, when an impulse surge voltage is applied under application of 100 V of DC voltage, a follow current is cut off by limiting DC current to 10 A.

EXAMPLE 3

Figure 3:
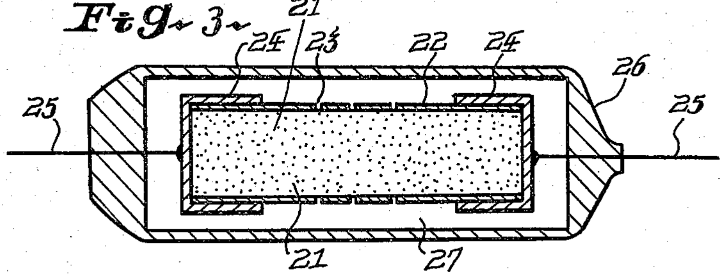
FIG. 3 is a longitudinal sectional view of a further embodiment of the invention.

FIG. 3 is a longitudinal sectional view of this example.

In this example, a molded insulating body 21 is manufactured by extruding steatite porcelain powder into a cylinder and then burning the thus extruded cylinder at a temperature of more than 1,300° C. in the air. Then, tantalum vapor or ion is generated in the reduced atmosphere of nitrogen gas to be deposited on the surface of the molded insulating body 21 as a tantalum nitride (TaN) thin film 22. The tantalum nitride thin film 22 thus deposited on the surface of the molded insulating body 21 is marked off with three streaks 23, 23, 23 having respectively a width of about 150 μm by use of YAG laser to be separated into four areas. Cap like electrode made of Kovar 24 is directly fixed to each of the end tantalum nitride thin films 22, 22, respectively by mechanical pressing. Dumet wire 25 is fastened to each of the electrodes 24, 24 respectively by welding. Then, the thus constructed element is introduced into the reduced atmosphere of nitrogen gas 27 having a pressure of about 500 mmHg to be covered wholly with lead glass 26 for sealing the nitrogen gas 27 between electrodes 24, 24.

In this construction, the electrostatic capacity of the example is 0.5 pF and the DC sparkover voltage is 1,000 V. The discharge rate curve of this example is shown by a curve of FIG. 6 which is indicated as Example 3. According to FIG. 6, when a surge voltage having an impulse surge wave form of $(1\times40)$ $\mu$sec is 1,580 V, the discharge rate is 50% and when the surge voltage is more than 1,850 V, the discharge rate is 100%. Further, when an impulse surge voltage is applied under application of 100 V of DC voltage, a follow current is cut off by limiting DC current to 10 A.

What is claimed is:

1. A surge absorber comprising a plurality of areas of conductive ceramic thin film formed on the surface of a molded insulating body having a relative inductive capacity of more than one and separated from each other by a streak of less than 200 $\mu$m in width, said conductive ceramic thin film being one selected from the group consisting of conductive metal oxides and interstitial nitrides, electrodes consisting of an anticorrosive and highly conductive metallic material directly fixed to both ends of said plurality of areas of conductive ceramic thin film and apart from said streak respectively, and at least one gas selected from the group consisting of rare gases and nitrogen gas sealed between the electrodes by means of an insulating material, so as to generate an electron emission through said streak at a first stage and then generate a creeping discharge between said electrodes at a second stage when a surge voltage is applied to said electrodes.

2. A surge absorber as claimed in claim 1 wherein said conductive metal oxide is one selected from the group consisting of tin oxide ($SnO_2$), niobium oxide ($Nb_2O_5$), milybdenum oxide ($MoO_3$) and tungsten oxide ($WO_3$).

3. A surge absorber as claimed in claim 2 wherein said conductive metal oxide is tin oxide ($SnO_2$).

4. A surge absorber as claimed in claim 1 wherein said interstitial nitride is one selected from the group consisting of titanium nitride (TiN) and tantalum nitride (TaN).

5. A surge absorber as claimed in claim 1 wherein said molded insulating body is composed of an insulating material having a relative inductive capacity of 6–10.

6. A surge absorber as claimed in claim 5 wherein said molded insulating body is composed of one selected from the group consisting of mullite porcelain, forsterite porcelain, alumina porcelain and steatite porcelain.

7. A surge absorber as claimed in claim 1 wherein said sealed gas is a mixed gas consisting of argon gas of 0.1–10% and neon gas of 99.9–90.0% by volume.

* * * * *